United States Patent Office 3,503,756
Patented Mar. 31, 1970

3,503,756
METHOD OF PRODUCING SAUSAGE PRODUCTS
Hugo E. Wistreich, Chicago, Ill., assignor to B. Heller & Company, a corporation of Illinois
No Drawing. Filed Oct. 18, 1966, Ser. No. 587,400
Int. Cl. A22c 11/00; B02c 18/00
U.S. Cl. 99—109
5 Claims

ABSTRACT OF THE DISCLOSURE

The method of this invention deals with the formation of meat emulsions into products such as skinless frankfurters without the use of casings by extruding the meat emulsion in a manner giving it an appropriate shape and contacting the extrudate while it is without physical support at least initially, with a hot edible aqueous acid solution to form a cohesive surface layer.

---

This invention relates to the preparation of ground meat products. More particularly, it relates to a simple, efficient method of preparing frankfurters, sausages and related meat products. Still more particularly, it relates to ground meat compositions and their formation into so-called "skinless" products such as frankfurters, smoked or unsmoked sausage links, and the like.

Briefly, the present invention comprises the method of converting meat emulsions into products having cohesive surface layers ready for packaging and for the consumer market in which a mixture of cured meat and seasoning and curing composition is passed through a grinder or chopper to effect suitable comminution and formation of meat emulsion, passing the solid meat emulsion through an extruder, contacting the extruded emulsion with a protein coagulating medium comprising an aqueous medium containing an edible acid and maintained at a temperature such that proteins at the periphery of the extruded emulsion are denatured to form a cohesive surface.

Heretofore, frankfurters, and the like, have been made from ground meat, curing agents, flavoring materials and colloidal water-binding agents. After a chopping operation wherein the components are reduced to so-called "emulsion," the plastic emulsion material is passed through a suitable horn and stuffed into suitable casings, i.e., either natural gut casings or artificial casings. These casings are more or less porous so that the contents may be properly cured or given a smoke flavor by the cooking or smoking operations that follow. After the cooking or smoking operations, the products are chilled and the casings stripped from the product prior to packaging for the market.

Introduction of meat emulsion into a casing and removal of casings from the final product can be time consuming operations and result in considerable wastage. If a casing is not properly positioned relative to the stuffing horn by the operator or machine, for example, a shirred and compressed casing can break over and the end of the stuffing horn can rupture the casing, requiring a halt to the stuffing operation and wastage of emulsion which escaped through the break in the casing. At the later stages of the processing, the casing can stick to the cooked meat and tear the surface during the stripping operation, thus giving the product an appearance which is not acceptable to consumers.

Now it has been discovered that ground meat products can be processed without the need for casings and products prepared for the consumer market having a cohesive surface of the type associated with "skinless" frankfurters, sausages, and the like, by a process wherein ground meat, etc., compositions are extruded into an acid solution which induces protein denaturation and formation of a cohesive surface either on a continuous extrudate or on segregated extrudates of a size associated in the consumer public mind as frankfurter length, sausage links, and the like.

More in detail, in accordance iwth the process of this invention, the meat emulsion is extruded from a suitable pressure applying device. The meat issues in a suitable configuration through a nozzle or so-called stuffing horn. The shaped extrudate may be subjected at the outlet of the horn to segregating means, i.e., means to cut off and mold the ends of individual meat units such as a frankfurter or the extrudate can be processed initially as a continuous unit and later cut and shaped and the ends processed to form the cohesive surface in a subsequent processing bath prior to conventional heating or smoking operation.

Extruded meat emulsion may be subjected to at least the start of the protein denaturation operation before it contacts physical support so that adherence to and deformation due to plasticity is to a major extent avoided. Such protein denaturation may be accomplished by spraying the extrudate with hot acid solution, by immersion in a hot acid bath, etc., or any combination thereof.

The acid silution contains edible acids in quantities to maintain a hydrogen ion concentration productive of a pH in the range between about 2.0 and 4.0, preferably in the range between about 2.5 and 3.5. In addition, the acid solution may contatin salts whose use is permitted in food processing by the Food and Drug Administration, such as potassium aluminum sulphate. In an effective acid solution used as an immersion bath, the titratable acidity should be at least 1% or denaturation will be too slow for a rapid formation of an effective skin. On the other hand, the titratable acidity should not exceed about 10% acid contents since the presence of large acid contents can result in hydrolysis of the proteins and impart undesirable favor and other effects. Preferably the titratable acidity is maintained between about 4% and 8%.

Suitable edible acids are organic acids such as acetic acid, ascorbic acid, citric acid, fumaric acid, malic acid, and the like, and inorganic acids such as hydrochloric acid, phosphoric acid, etc.

Acid solution of pH in the above set forth range is effective to denature proteins in the meat in a short time when the temperature of the solution at the time of contact with the meat emulsion extrudate is in the range between about 80° F. and 180° F., and preferably, in the range between 110° F. and 130° F.

Under the above conditions of pH and temperature, the time of treatment sufficient to form a cohesive surface layer or skin is in the range between about 5 seconds and 100 seconds with the required time of treatment being of shorter duration at the higher temperatures, i.e., time and temperature vary inversely. After initial contact with acid solution, the meat emulsion extrudate can be supported mechanically until a skin of suitable thickness for safe manual handling and further processing, if desired, is developed. Such a secondary contact with acid solution should not be of such duration that the meat acquires a distinct taste due to reaction with acid.

A frankfurter product packaged for the consumer market may be produced by the following procedure. Meat emulsion is extruded from conventional apparatus through a conventional stuffing horn which would in conventional operation introduce the emulsion into a suitable casing.

Emulsion as it issues from the horn is segregated, i.e., cut off in, for example, frankfurter length in the course of which the end is molded into the conventional rounded terminus.

The formed frankfurter has its lower portion at the time of cut off submerged below the liquid level in the acid bath so that denaturation of proteins is initiated.

The acid bath is in a rectangular tank adapted with suitable internal or external means for circulating heating medium so as to maintain the acid solution at a temperature of, for example, 120° F., and with a conveyor for which the tank sides act as guides. This conveyor is most deeply submerged adjacent the end of the tank into which the frankfurter lengths of extruded emulsion settle. The conveyor belt operating at a speed providing for the frankfurter a desired residence time in the bath, removes the franks from the bath, travels them in air a distance permitting acid solution drainage and then discharges the frankfurters to a conveyor for passage through a cooking unit.

A cooking unit is preferably a hot air tunnel adapted with means to maintain a temperature in the range between about 180° F. and 210 F. Air temperatures can be maintained in this range by circulating air heated at a point outside the unit by such means as a gas flame, or by heat transfer from heating coils, and the like, as infrared and microwave heaters.

After passage through the cooking unit, the frankfurters are moved on a conveyor through a spray brine chill tunnel or air blast chill tunnel or equivalent means and the cooled frankfurters are delivered to a packaging line where the frankfurters are put into, for example. 1 and 2 pound clear film wrappers.

The value of the invention will be more clearly understood by reference to the illustrative embodiments thereof described below, it being understood that the detailed description is given by way of explanation and illustration and not by way of limitation, since various changes may be made without departing from the spirit and scope of the invention. In the examples, all components are given in parts by weight.

EXAMPLE I

A typical cooked frankfurter formula is as follows:

| | Pounds |
|---|---|
| Pork | 23½ |
| Beef | 50 |
| Salt | 3 |
| Curing salt | ¼ |
| Ice | 20 |
| Seasoning | 1 |

The beef is ground through a ⅛" plate and the pork trimmings are ground through a 3/16" plate. The ground beef is seasoned in a cutter adding the salt, curing salt and seasoning and chopped, adding 10 pounds of ice until all the ice is absorbed. The remainder of the ice is added and the mixture is chopped until the temperature reaches 35° F., following which the pork is added and chopping operation continued to reduce the mixture of particles of the requisite size for completing intermixture of the chopper contents.

The chopped solid material containing entrained moisture, is then introduced into an extrusion cylinder where pressure is applied and the solid material or emulsion extruded through a horn to extrude a continuous cylinder of conventional frankfurter cross-sectional dimension size. As the material was extruded, 6" segments were cut off and the end molded to a semi-circular configuration.

At the time of cutting the segments, the lower end of the 6" length of extrudate was immersed in the acid bath. Upon cutting off and molding of the end of a 6" segment, the segment settles through 12" of acid solution maintained at 110° F. before contacting a conveyor belt operating in the acid bath tank. The conveyor belt moved at a rate of 60 feet per minute thus providing each frankfurter with a one minute immersion in a bath solution of the following composition:

25 pounds by weight of a smoke flavor liquid which contains 6½% of acetic acid, 25 pounds of 100 grain vinegar (10% solution of acetic acid) and 50 pounds of water. The pH of this bath solution was 2.5 and the titratable acidity was 4% expressed as acetic acid.

Upon emerging from the bath, the frankfurters were drained and then transferred to a cooking chamber through which was passed hot air at a temperature of 195° F. Upon emerging from the cooking chamber, the frankfurters were sprayed with chilled brine, the brine having a temperature of 26° F.

Cooled frankfurters exhibited a tough cohesive surface of about 1 mil thickness and were capable of manual handling and mechanically packaging in cellophane packages in the same manner as frankfurters prepared by currently conventional processes.

EXAMPLE II

A frankfurter emulsion was prepared and passed through the same forming operations as described in Example I.

At the time of cut off and molding of the end of the frankfurter, the frankfurter was sprayed with an acid solution of the same character as described in Example I. After molding and spraying, the frankfurter was dropped into the acid bath tank where it settled through 12 inches of solution maintained at 120° F., before contacting the conveyor belt. The conveyor belt moved at a rate providing each frankfurter with 30 seconds immersion in a bath solution of the following composition:

25 pounds of smoke flavor liquid which contains 6½% of acetic acid, 5 pounds of 20% solution of potassium aluminum sulphate hydrate (alum) and 50 pounds of water. This solution had a pH of 2.3 and a titratable acidity of 2%. The cohesive surface formed on frankfurters in this manner has comparable thickness and durability as that formed on the frankfurters of Example I.

I claim:

1. The method of forming meat emulsions into products having cohesive surface layers thereby rendering the products ready for further processing which consists of extruding a meat emulsion in a manner shaping it in an appropriate cross-sectional dimension for holding its shape while suspended without physical support, contacting said shaped meat emulsion extrudate with a hot edible aqueous acid solution of pH in the range between about 2 and 4.5, for a period in the range between about 5 seconds and about 100 seconds, said contact being at least initially while said extrudate is physically unsupported to form a surface layer thereon which will prevent appreciable deformation when contact is made with physical support, said acid solution in contact with said extrudate having a titratable acidity of edible acid in the range between about 1% and 10%, and being maintained at a temperature in the range between 110° F. and 180° F.

2. The process according to claim 1 wherein the acid solution contacts meat emulsion extrudate while the extrudate is unsupported, in the form of liquid spray.

3. The method according to claim 1 wherein the temperature of the acid solution is in the range between about 110° F. and about 130° F.

4. The method according to claim 1 in which the step of cooking segments of extrudate at a temperature in the range between 180° F. and 210° F. follows acid bath treatment of extrudate.

5. The method according to claim 4 in which the step of chilling segments follows the step of cooking meat emulsion extrudate segments.

References Cited

UNITED STATES PATENTS

| | | | |
|---|---|---|---|
| 2,197,517 | 4/1940 | Cohee | 99—147 |
| 3,106,473 | 10/1963 | Hollenbeck | 99—229 |
| 3,121,638 | 2/1964 | Tauber et al. | 99—109 |
| 3,123,481 | 3/1964 | Seiler | 99—109 X |
| 3,220,855 | 11/1965 | Shank | 99—109 X |

HYMAN LORD, Primary Examiner

U.S. Cl. X.R.

99—108, 229

PO-1050
(5/69)

UNITED STATES PATENT OFFICE
CERTIFICATE OF CORRECTION

Patent No. 3,503,756　　　　　Dated March 31, 1970

Inventor(s) Hugo E. Wistreich

It is certified that error appears in the above-identified patent and that said Letters Patent are hereby corrected as shown below:

Column 2, line 13, "iwth" should be -- with -- ;

Column 2, line 24, "operation" should be -- operations -- ;

Column 2, line 32, "silution" should be -- solution -- ;

Column 2, line 34, "4.0" should be -- 4.5 -- ;

Column 2, line 36, "contatin" should be -- contain -- .

SIGNED AND
SEALED
AUG 11 1970

(SEAL)
Attest:

Edward M. Fletcher, Jr.
Attesting Officer

WILLIAM E. SCHUYLER, JR.
Commissioner of Patents